United States Patent [19]

Hsieh et al.

[11] Patent Number: 5,761,333
[45] Date of Patent: Jun. 2, 1998

[54] CONTRAST ENHANCEMENT FOR CT SYSTEMS

[75] Inventors: Jiang Hsieh, Waukesha; Stanley H. Fox, Brookfield, both of Wis.

[73] Assignee: General Electric Company, Milwaukee, Wis.

[21] Appl. No.: 914,697

[22] Filed: Aug. 19, 1997

Related U.S. Application Data

[63] Continuation of Ser. No. 381,135, Jan. 31, 1995, abandoned.

[51] Int. Cl.$^6$ ........................................... G06K 9/00
[52] U.S. Cl. ............................................... 382/131
[58] Field of Search ..................... 382/131, 132, 382/224, 169; 378/4; 250/582

[56] References Cited

U.S. PATENT DOCUMENTS

| | | | |
|---|---|---|---|
| 4,302,672 | 11/1981 | Kato et al. | 382/132 |
| 4,346,409 | 8/1982 | Ishida et al. | 364/413.13 |
| 4,641,267 | 2/1987 | Asai et al. | 364/413.13 |
| 4,682,028 | 7/1987 | Tanaka et al. | 364/413.13 |
| 4,821,213 | 4/1989 | Cline et al. | 395/124 |
| 4,831,528 | 5/1989 | Crawford et al. | 364/413.22 |
| 4,839,805 | 6/1989 | Pearson, Jr. et al. | 364/413.14 |
| 4,879,668 | 11/1989 | Cline et al. | 395/124 |
| 4,914,589 | 4/1990 | Crawford | 364/413.17 |
| 4,950,894 | 8/1990 | Hara et al. | 382/169 |
| 5,166,876 | 11/1992 | Cline et al. | 364/413.13 |
| 5,233,518 | 8/1993 | King et al. | 364/413.18 |
| 5,265,142 | 11/1993 | Hsieh | 378/4 |
| 5,270,923 | 12/1993 | King et al. | 364/413.13 |
| 5,297,550 | 3/1994 | Margosian | 364/413.13 |
| 5,369,572 | 11/1994 | Haraki et al. | 382/132 |
| 5,426,582 | 6/1995 | Bossaert et al. | 364/413.14 |
| 5,426,684 | 6/1995 | Gaborski et al. | 364/413.13 |
| 5,454,053 | 9/1995 | Okubo et al. | 382/132 |

OTHER PUBLICATIONS

H. E. Johns & J. R. Cunningham, The Physics of Radiology, Charles C. Thomas, 1983, p. 164.
L. L. Berland, Practical CT, Technology and Techniques, Raven Press, New York, 1986, p. 94.

*Primary Examiner*—Yon J. Couso
*Attorney, Agent, or Firm*—John S. Beulick; John H. Pilarski

[57] ABSTRACT

The present invention, in one form, is a method for improving grey-white matter differentiation between regions of an image to be reconstructed from data obtained by a CT scan. More particularly, in accordance with one form of the present invention, a re-mapping function is utilized to generate CT numbers. In accordance with such function, CT numbers that are outside the grey-white matter region are not "stretched". The CT numbers within such region are "stretched" with the larger "stretch" centered on the grey-white matter region and tapering off at the boundary. Using such a function, grey-white matter differentiation is improved without adversely affecting quality and accuracy.

8 Claims, 4 Drawing Sheets

CONTRAST ENHANCEMENT FOR CT SYSTEMS

This application is a Continuation of application Ser. No. 08/381,135, filed Jan. 31, 1995 now abandoned.

FIELD OF THE INVENTION

This invention relates generally to computed tomography (CT) imaging and more particularly, to improving the quality of an image by utilizing a contrast enhancement algorithm with variable contrast and noise reduction parameters.

BACKGROUND OF THE INVENTION

In CT systems, an x-ray source projects a fan-shaped beam which is collimated to lie within an X-Y plane of a Cartesian coordinate system, termed the "imaging plane". The x-ray beam passes through the object being imaged, such as a patient, and impinges upon a linear array of radiation detectors. The intensity of the transmitted radiation is dependent upon the attenuation of the x-ray beam by the object. Each detector of the linear array produces a separate electrical signal that is a measurement of the beam attenuation. The attenuation measurements from all the detectors are acquired separately to produce a transmission profile.

The x-ray source and the linear detector array in a CT system are rotated with a gantry within the imaging plane and around the object so that the angle at which the x-ray beam intersects the object constantly changes. A group of x-ray attenuation measurements from the detector array at one gantry angle is referred to as a "view". A "scan" of the object comprises a set of views made at different gantry angles during one revolution of the x-ray source and detector. In an axial scan, data is processed to construct an image that corresponds to a two dimensional slice taken through the object. One method for reconstructing an image from a set of data is referred to in the art as the filtered backprojection technique. This process converts the attenuation measurements from a scan into integers called "CT numbers" or "Hounsfield units", which are used to control the brightness of a corresponding pixel on a cathode ray tube display.

A reduction in scan time can be achieved by translating a patient in the z-axis synchronously with the rotation of the gantry. The combination of constant patient translation along the z-axis during the rotation of the gantry and acquisition of projection data is known as helical scanning. Helical scanning is described, for example, in U.S. Pat. No. 5,233,518 which is assigned to the present assignee. In addition to reduced scanning time, helical scanning provides other advantages such as better control of contrast, improved image reconstruction at arbitrary locations, and better three-dimensional images.

With respect to both helical and axial scanning, many efforts have been undertaken to enhance the contrast of a resulting image. Measuring low contrast resolution involves determining how easy it is to see objects whose CT density is similar to that of their surroundings. The factors that influence the result include all the major components of a CT system, e.g., the x-ray generation and detection sub-system, calibration and reconstruction sub-system, and the image display sub-system. One example of contrast enhancement involves improving grey-white matter differentiation. The grey-white matter contrast in an image is closely related to the low contrast resolution of the system. There exists a need to improve contrast enhancement while maintaining image quality and accuracy.

SUMMARY OF THE INVENTION

The present invention, in one form, is a method for improving contrast enhancement for a CT image. More particularly, and in accordance with one form of the present invention for enhancing grey-white matter differentiation, a re-mapping function is utilized to generate CT numbers. Specifically, the original grey scale is divided into three regions, namely, a stretched region, a compressed region, and a no-op region. The stretched region corresponds to the range in which contrast is to be enhanced. The CT numbers within such region are "stretched" with the larger "stretch" centered on the grey-white matter region and tapering off at the boundary. The term "stretch", as used herein, means to increase the rate of CT number change. The compressed region corresponds to the range where contrast is reduced, and the no-op region is where no modification is performed. Using such a function, grey-white matter differentiation is improved without adversely affecting quality and accuracy.

DETAILED DESCRIPTION OF THE DRAWINGS

Figure 1:
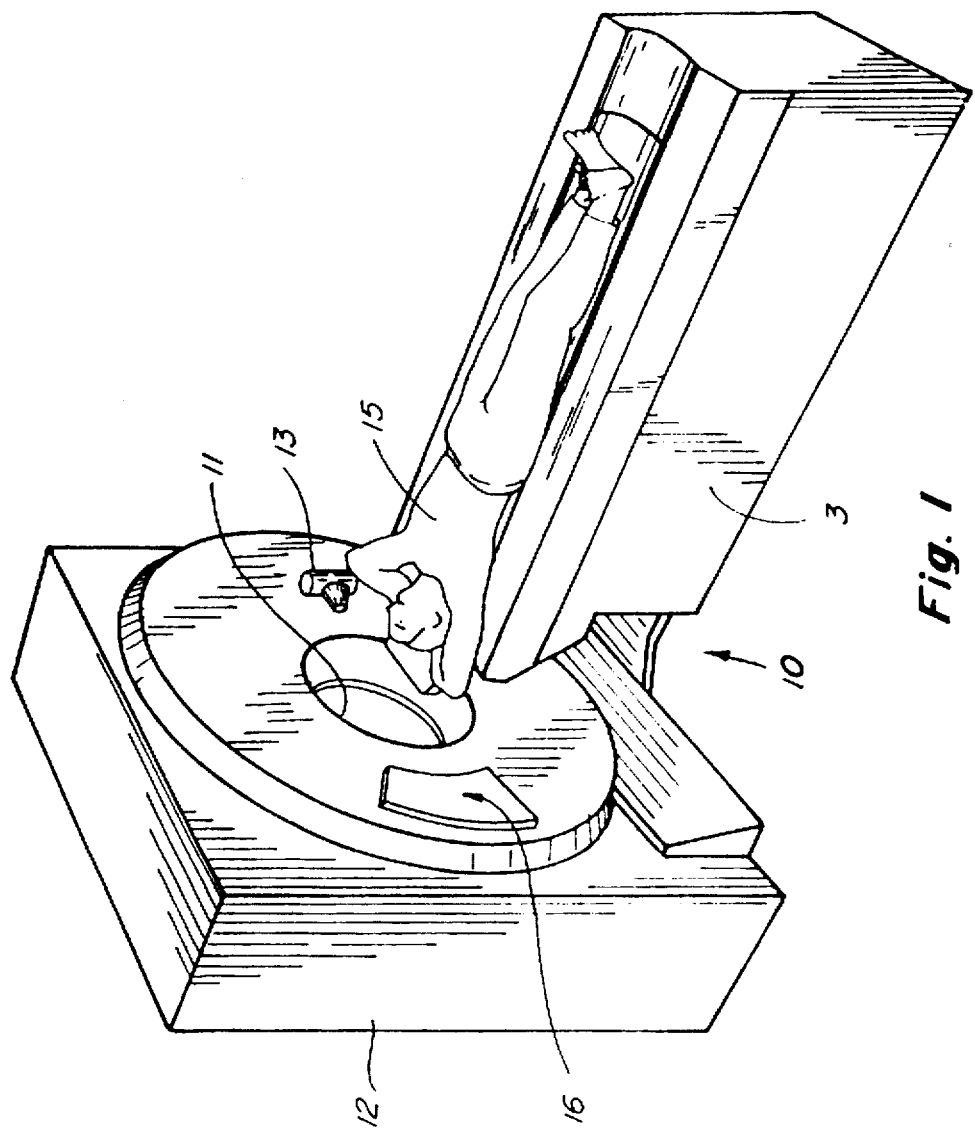
FIG. 1 is a pictorial view of a CT imaging system in which the present invention may be employed.
Figure 2:
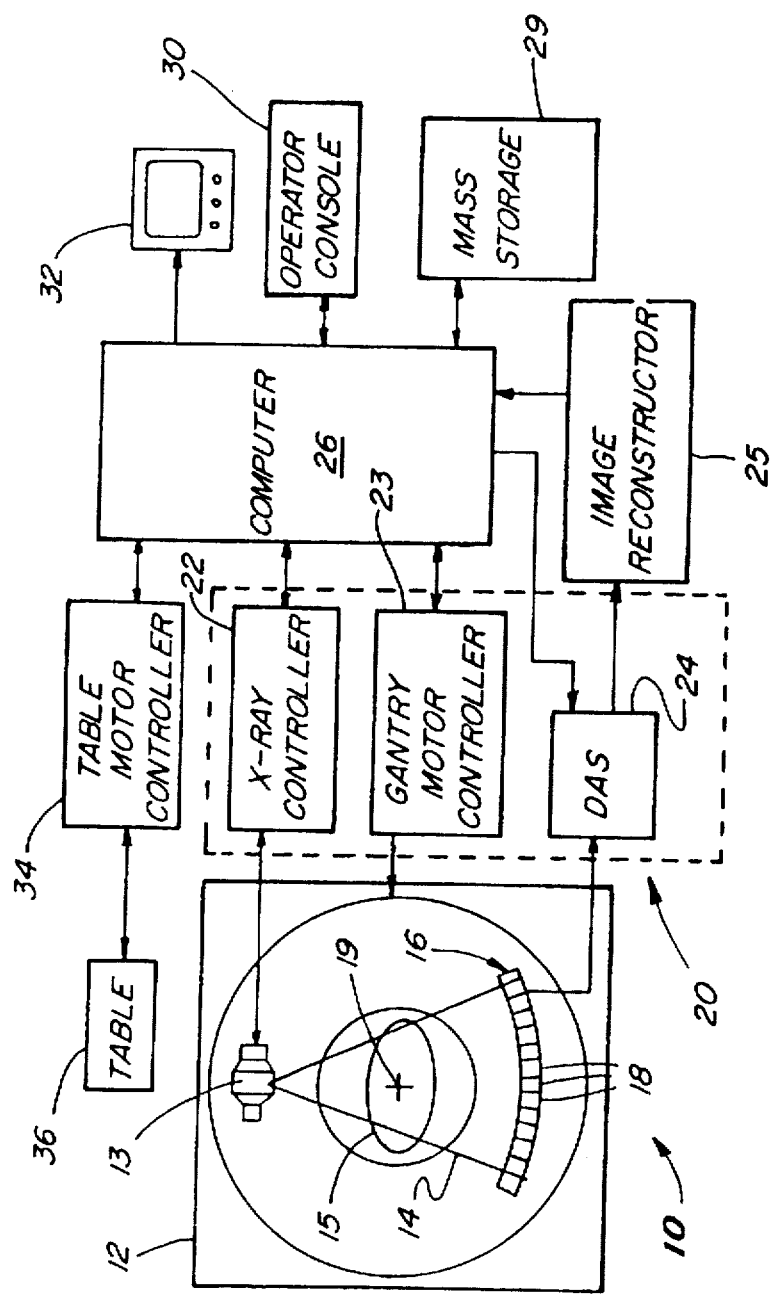
FIG. 2 is a block schematic diagram of the CT imaging system illustrated in FIG. 1.

With reference to FIGS. 1 and 2, a computed tomography (CT) imaging system 10 includes a gantry 12 representative of a "third generation" CT scanner. Gantry 12 has an x-ray source 13 that projects a beam of x-rays 14 toward a detector array 16 on the opposite side of gantry 12. Detector array 16 is formed by two rows of detector elements 18 which together sense the projected x-rays that pass through a medical patient 15. Each detector element 18 produces an electrical signal that represents the intensity of an impinging x-ray beam and hence the attenuation of the beam as it passes through patient 15. During a scan to acquire x-ray projection data, gantry 12 and the components mounted thereon rotate about a center of rotation 19.

Rotation of gantry 12 and the operation of x-ray source 13 are governed by a control mechanism 20 of CT system 10. Control mechanism 20 includes an x-ray controller 22 that provides power and timing signals to x-ray source 13 and a gantry motor controller 23 that controls the rotational speed and position of gantry 12. A data acquisition system (DAS) 24 in control mechanism 20 samples analog data from detector elements 18 and converts the data to digital signals for subsequent processing. An image reconstructor 25 receives sampled and digitized x-ray data from DAS 24 and performs high speed image reconstruction. The reconstructed image is applied as an input to a computer 26 which stores the image in a mass storage device 29.

Computer 26 also receives commands and scanning parameters from an operator via console 30 that has a keyboard. An associated cathode ray tube display 32 allows the operator to observe the reconstructed image and other data from computer 26. The operator supplied commands and parameters are used by computer 26 to provide control signals and information to DAS 24, x-ray controller 22 and gantry motor controller 23. In addition, computer 26 operates a table motor controller 34 which controls a motorized table 36 to position patient 15 in gantry 12.

In reconstructing an image slice, typically a projection data array is created. Once the array is created, the data elements within the array are assigned weights. The weighted data is then used to created a weighted projection data array. Using the weighted projection data array, the data is filtered and back projected. An image data array is created as a result of the filtering and backprojection.

With respect to the present algorithm, such algorithm is described below in detail in the context of enhancing grey-white matter differentiation. The present algorithm, of course, may be used in many other contrast enhancement contexts.

Figure 3:
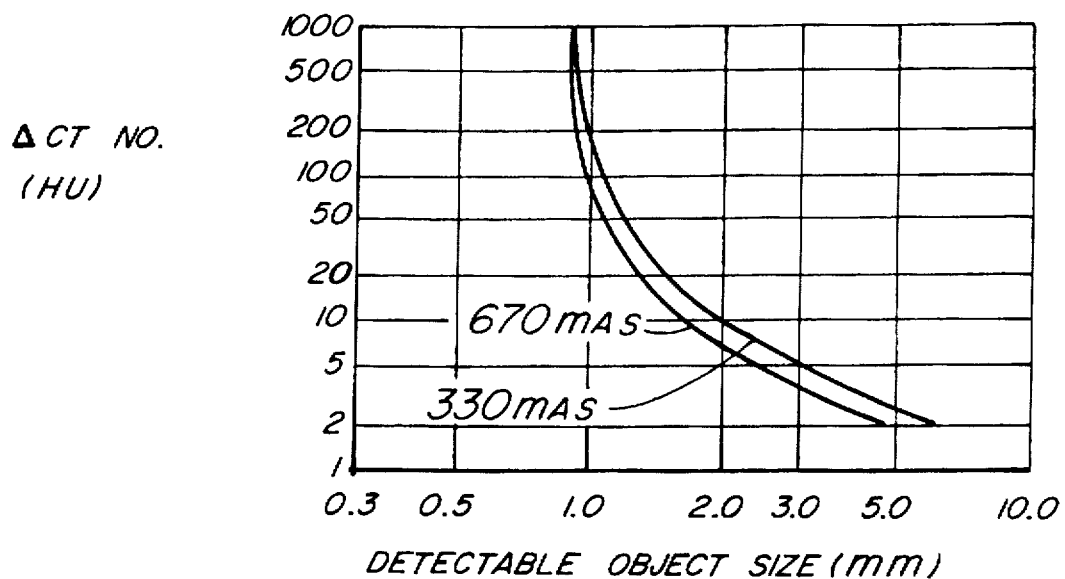
FIG. 3 illustrates object delectability size as a function of CT number difference and noise.

The diameter of the smallest detectable object in millimeters is a function of the CT number difference and noise. For example, and for the simplicity of explanation, assume that the original CT number difference between an object and its background, $\Delta CT$, is 5. Assume further that the scan is taken with the x-ray source energized at 670 mAs and with conditions identical to those set forth in the curve illustrated in FIG. 3. The smallest detectable object is 2.4 mm. If $\Delta CT$ can be increased by a factor of $\sqrt{2}$ to 7.1, the smallest detectable object can be reduced to 2.0 mm. Assuming this increase is accomplished by simply using a narrower display window (this is equivalent to stretching the grey scale linearly), the noise increase in the image can be determined based on the following equation:

$$\sigma'^2 = k^2 \sigma^2 = 2\sigma^2 \quad (1)$$

where k is a scaling factor and $\sigma$ and $\sigma'$ are the standard deviations of the images before and after the operation. From the curve set forth in FIG. 3, it can be seen that the smallest detectable object is degraded from 2.0 mm to 2.4 mm. Therefore, using a narrower window to enhance the grey-white differentiation does not provide a benefit from a low contrast resolution point of view.

To benefit from the grey scale stretching, the CT number differentiation must be increased while keeping the noise increase to a minimum. For example, if a mapping scheme doubles $\Delta CT$ from 5 to 10 while keeping the increase in variance to a factor of 2 (instead of 4), the smallest detectable object can then be reduced from 2.4 mm 2.0 mm, which is a 20% improvement.

Figure 4:
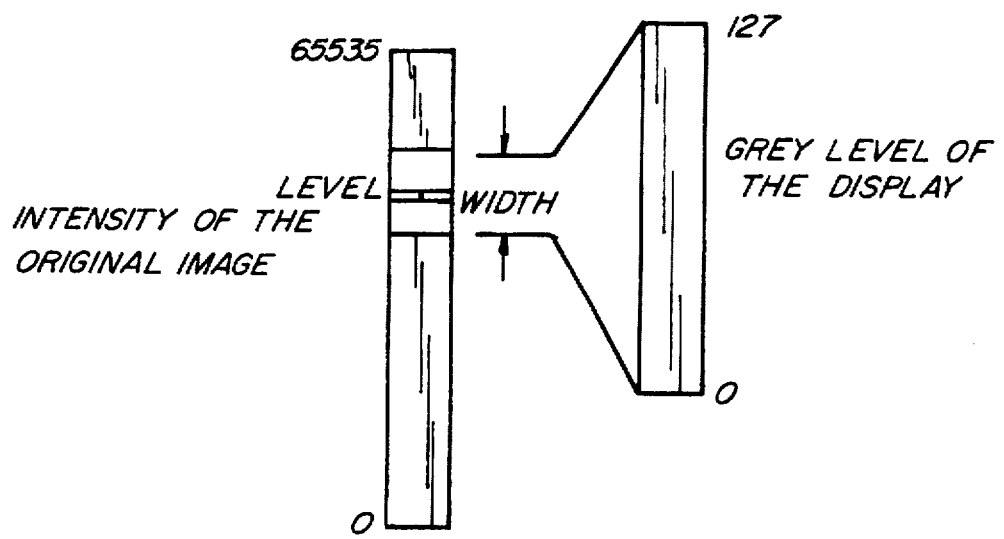
FIG. 4 illustrates the grey scale range and mapping of an image.

In a typical CT scan, the white matter has a CT number about 35 and the grey matter has a CT number near 27. Normally, a display window width of 80 and a level of 35 is selected for the optimal observability. Particularly, and referring to FIG. 4, the bar on the left hand side represents the entire grey scale range of an original image. Since the value of each pixel in the image is represented by two bytes (16 bits), the numbers can range from 0 to $2^{16}-1$. Therefore, there are 65536 different levels of intensities. However, a typical display system has only 128 shade of grey ($2^7$). To be able to look at every detail in the image, only a small portion of the original intensity is mapped linearly to the display. The intensities that are below the window are set to 0 and the intensities that are above the window are set to 127. The window level is the center of the selected range and the window width is the span of the selected range.

The dynamic range of the display system extends beyond the region of the grey-white matters. Since the objective is to enhance the grey-white contrast, it is unnecessary to stretch the grey scales that are outside the grey-white matter range. In addition, a steeper increase should be centered on the grey-white matter region and the stretch should gradually taper off at the boundary. The function should therefore have the following form:

$$G' = \begin{cases} f(G) & \text{if } t_b < G \leq t_u \\ G & \text{otherwise} \end{cases} \quad (2)$$

where G and G' are the CT numbers before and after re-mapping, and $f$ is a monotonically increasing function with its derivative reaching a maximum where the CT number differentiation needs to be stretched most. The values for $t_b$ and $t_u$ are 0 and 60, respectively.

Figure 5:
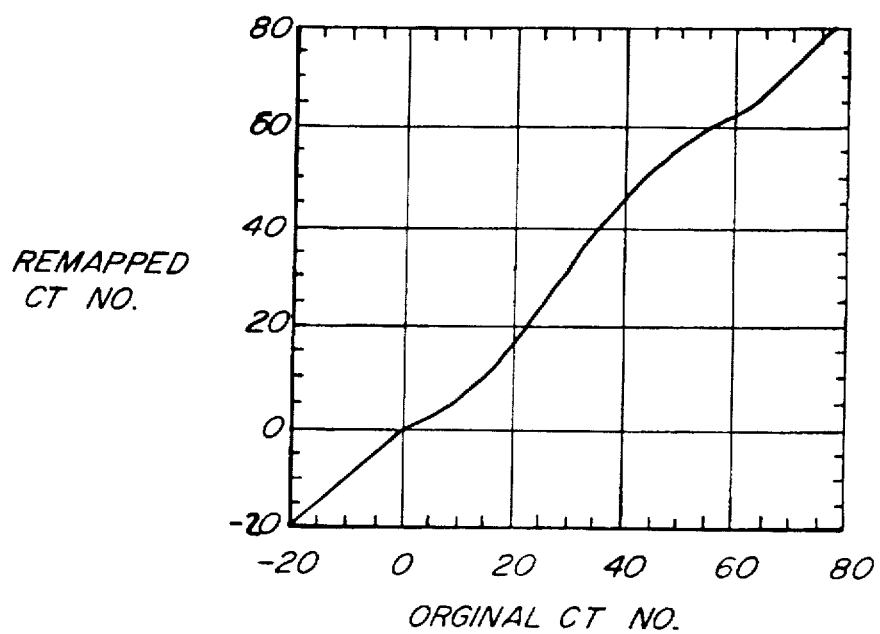
FIG. 5 illustrates an example of a mapping function.

FIG. 5 shows an example of the re-mapping function where $f$ is an exponential function in accordance with the following:

$$G' = \begin{cases} w[((w-c+G)/w)^\alpha] + c - w & \text{if } c - w < G \leq c \\ w[2 - ((w+c-G)/w)^\alpha] + c - w & \text{if } c < G \leq c+w \\ G & \text{Otherwise} \end{cases} \quad (3)$$

where $w=30$, $c=30$ and $\alpha=1.6$, with "c" and "w" representing the center (or the mid-point) and the half width of the grey scale modification region, respectively. Therefore, the original grey scale is modified for the regions [c−w, c+w]. The exponential function (3) is symmetrical. The function, however, does not have to be symmetrical.

With respect to the remapping function shown in FIG. 5, the original CT number (or grey scale) from 14 to 46 (grey scale range of 46−14=32) is stretched to cover a range from 9 to 51 (grey scale range of 51−9=42). At the same time, the grey scales from 0–13 and 47–60 are compressed to 0–8 and 52–60. The other regions (−20–1 and 61–80) are unchanged.

Using the above-described re-mapping function, improved grey-white matter differentiation is provided. Such improvement is possible without adversely affecting quality and accuracy. Further, although the present algorithm has been described in the context of improving grey-white matter contrast, the present algorithm may be used in many other contrast enhancement contexts.

From the preceding description of one embodiment of the present invention, it is evident that the objects of the invention are attained. Although the invention has been described and illustrated in detail, it is to be clearly understood that the same is intended by way of illustration and example only and is not to be taken by way of limitation. For example, rather than modifying the image data using the above described re-mapping finction, the look-up table used to map the original image to this display video memory may be modified in accordance with the function illustrated in Equation 2. Alternatively, the gamma curve stored for the display device and filming device could similarly be modified. Accordingly, the spirit and scope of the invention are to be limited only by the terms of the appended claims.

What is claimed is:

1. A method for displaying on a display an image utilizing data obtained from CT scan attenuation measurements, the attenuation measurements being converted into CT numbers used to control the brightness of pixels on a display, said method comprising the steps of:

generating, from the attenuation measurements, CT numbers;

identifying a grey-white matter region having respective lower and upper boundaries $t_b$ and $t_u$ within which CT number differentiation is to be remapped;

remapping the CT number differentiation in accordance with the following function:

$$G' = \begin{cases} f(G) & \text{if } t_b < G \leq t_u \\ G & \text{otherwise} \end{cases}$$

where G and G' are the CT numbers before and after re-mapping, and f is a monotonically increasing function with its derivative reaching a maximum at approximately a center of the grey-white matter region; and displaying an image on the display using the remapped CT numbers.

2. A method in accordance with claim 1 where the function f is an exponential function in accordance with the following function:

$$G' = \begin{cases} w[((w-c+G)/w)^\alpha] + c - w & \text{if } c - w < G \leq c \\ w[2 - [((w+c-G)/w)^\alpha]] + c - w & \text{if } c < G \leq c + w \\ G & \text{Otherwise} \end{cases}$$

where c and w are a mid-point and a half width, respectively, of the grey-white matter region.

3. A system for producing a tomographic image of an object, said system configured to enhance the contrast differentiation in a grey-white matter region, having lower and upper boundaries $t_b$ and $t_u$, of an image to be displayed by:

separating the grey-white matter region into a first, second and third region, the first region being substantially centered within the grey-white matter region and the second region being closer to a boundary of the grey-white matter region than the first region;

remapping the CT number differentiation in at least the first and second regions by increasing the rate of CT number change in the first region and decreasing the rate of CT number change in the second region; and displaying an image using the remapped CT numbers.

4. A system in accordance with claim 3 wherein the rate of CT number change is made in accordance with the following function:

$$G' = \begin{cases} f(G) & \text{if } t_b < G \leq t_u \\ G & \text{otherwise} \end{cases}$$

where G and G' are the CT numbers before and after re-mapping, and $f$ is a monotonically increasing function with its derivative reaching a maximum at approximately a center of the grey-white matter region of the image.

5. A system in accordance with claim 4 where the function f is an exponential function in accordance with the following function:

$$G' = \begin{cases} w[((w-c+G)/w)^\alpha] + c - w & \text{if } c - w < G \leq c \\ w[2 - [((w+c-G)/w)^\alpha]] + c - w & \text{if } c < G \leq c + w \\ G & \text{Otherwise} \end{cases}$$

where c and w are a mid-point and a half width, respectively, of the grey-white matter region.

6. Apparatus for producing, on a display, a tomographic image of an object from data acquired in a helical scan, said apparatus comprising:

a CT scanner for collecting data to be used in creating an image of an object;

a control mechanism for converting the data into CT numbers; and means for enhancing the contrast differentiation of the image, said enhancing means programmed to perform the steps of:

separating a grey-white matter region into a first, second and third region, the first region being substantially centered within the grey-white matter region and the second region being closer to a boundary of the grey-white matter region than the first region;

remapping the CT number differentiation in at least the first and second regions by increasing the rate of CT number change in the first region and decreasing the rate of CT number change in the second region.

7. Apparatus in accordance with claim 6 wherein the rate of CT number change is made in accordance with the following function:

$$G' = \begin{cases} f(G) & \text{if } t_b < G \leq t_u \\ G & \text{otherwise} \end{cases}$$

where G and G' are the CT numbers before and after re-mapping, and $f$ is a monotonically increasing function with its derivative reaching a maximum at approximately a center of the grey-white matter region of the image.

8. Apparatus in accordance with claim 7 where the function f is an exponential function in accordance with the following function:

$$G' = \begin{cases} w[((w-c+G)/w)^\alpha] + c - w & \text{if } c - w < G \leq c \\ w[2 - [((w+c-G)/w)^\alpha]] + c - w & \text{if } c < G \leq c + w \\ G & \text{Otherwise} \end{cases}$$

where c and w are a mid-point and a half width, resrectively, of the grey-white matter region.

* * * * *